United States Patent
Ren et al.

(10) Patent No.: US 9,641,513 B2
(45) Date of Patent: May 2, 2017

(54) METHODS AND SYSTEMS FOR CONTROLLING MOBILE TERMINAL ACCESS TO A THIRD-PARTY SERVER

(71) Applicant: Tencent Technology (Shenzhen) Company Limited, Shenzhen, Guangdong Province (CN)

(72) Inventors: Min Ren, Shenzhen (CN); Hua Zong, Shenzhen (CN); Nan Liu, Shenzhen (CN); Pengzhuang Tang, Shenzhen (CN); Shuopei Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/409,714

(22) PCT Filed: Jul. 15, 2014

(86) PCT No.: PCT/CN2014/082277
§ 371 (c)(1),
(2) Date: Dec. 19, 2014

(87) PCT Pub. No.: WO2015/010558
PCT Pub. Date: Jan. 29, 2015

(65) Prior Publication Data
US 2016/0269396 A1    Sep. 15, 2016

(30) Foreign Application Priority Data

Jul. 24, 2013  (CN) .......................... 2013 1 0314224

(51) Int. Cl.
*H04L 29/06* (2006.01)
*H04W 12/06* (2009.01)
(Continued)

(52) U.S. Cl.
CPC .......... *H04L 63/0815* (2013.01); *G06F 21/41* (2013.01); *H04L 63/083* (2013.01);
(Continued)

(58) Field of Classification Search
CPC ... H04L 63/0815; H04L 63/08; H04L 63/083; H04L 67/02; G06F 21/41
See application file for complete search history.

(56) References Cited

U.S. PATENT DOCUMENTS 8,458,775 B2 * 6/2013 Lester ..................... G06F 21/31
                                                    713/152
8,620,876 B2 * 12/2013 Chan ................. G06F 17/30477
                                                    707/691
(Continued)

FOREIGN PATENT DOCUMENTS

CN    102821085 A    12/2012
CN    103036851 A    4/2013

OTHER PUBLICATIONS

International Search Report issued in Application No. PCT/CN2014/082277; mailing date: Oct. 22, 2014 (3 pgs.).
(Continued)

*Primary Examiner* — Yonas Bayou
(74) *Attorney, Agent, or Firm* — Morgan, Lewis & Bockius LLP

(57) ABSTRACT

The present disclosure includes an exemplary method for controlling access to a third-party server by a mobile terminal. The method comprises: acquiring, at the mobile terminal from a first-party server, login authorization information using which a user of the mobile terminal has logged in the first-party server through a client-side application corresponding to the first-party server, wherein the login authorization information includes a logged-in account; transmitting, to the third-party server, a login request, wherein the login request includes the login authorization
(Continued)

information that is to be verified; and receiving authorization for the user to log in the third-party server using the logged-in account included in the verified login authorization information.

20 Claims, 9 Drawing Sheets

(51) Int. Cl.
*G06F 21/41* (2013.01)
*H04L 29/08* (2006.01)

(52) U.S. Cl.
CPC ......... *H04L 63/0884* (2013.01); *H04W 12/06* (2013.01); *H04L 67/02* (2013.01)

(56) References Cited

U.S. PATENT DOCUMENTS

| | | | |
|---|---|---|---|
| 8,695,074 B2* | 4/2014 | Saraf | H04L 63/0815 709/228 |
| 8,925,052 B2* | 12/2014 | Deagon | G06F 21/41 709/227 |
| 8,978,116 B1* | 3/2015 | Spertus | H04N 21/25866 726/20 |
| 9,026,918 B2* | 5/2015 | Sharoni | G06F 9/547 715/740 |
| 9,104,442 B2* | 8/2015 | Sharoni | G06F 9/44526 |
| 9,268,931 B2* | 2/2016 | Subramaniam | G06F 21/41 |
| 2006/0031494 A1* | 2/2006 | Marcus | H04L 67/02 709/225 |
| 2014/0137227 A1* | 5/2014 | Long | H04L 63/0227 726/8 |

OTHER PUBLICATIONS

Tencent Technology, Written Opinion, PCT/CN2014/082277, Oct. 22, 2014, 4 pgs.

Tencent Technology, IPRP, PCT/CN2014/082277, Jan. 26, 2016, 5 pgs.

\* cited by examiner

METHODS AND SYSTEMS FOR CONTROLLING MOBILE TERMINAL ACCESS TO A THIRD-PARTY SERVER

CROSS-REFERENCE TO RELATED APPLICATION

This application claims priority and benefits to Chinese Patent Application No. 201310314224.5, filed on Jul. 24, 2013, the entire content of which is incorporated herein by reference.

TECHNICAL FIELD

The present disclosure relates generally to the technical field of the Internet. In particular, it provides methods and systems for controlling mobile terminal access to a server.

BACKGROUND

With existing technologies, in order to login to a website, it is common for a mobile terminal user to create a login account for the website and set up a corresponding password. But the account registered with, for example, website A can only be used to login to website A, but not to website B. With the growing number of internet sites, there are greater demands from the user to acquire a large amount of different information from internet sites. However, with the existing login method, to acquire information, users have to enter different account information to login to different websites. This is inconvenient. It is also difficult for users to remember login information for different sites.

SUMMARY

Exemplary embodiments of this disclosure provide methods and systems for controlling mobile terminal access to a third-party server. Exemplary embodiments address the cumbersome problem that mobile terminal users have to enter different account information for authentication when visiting different websites.

The present disclosure includes an exemplary method for controlling access to a third-party server by a mobile terminal. Embodiments of the method include: acquiring, at the mobile terminal from a first-party server, login authorization information using which a user of the mobile terminal has logged in the first-party server through a client-side application corresponding to the first-party server, wherein the login authorization information includes a logged-in account; transmitting, to the third-party server, a login request, wherein the login request includes the login authorization information that is to be verified; and receiving authorization for the user to log in the third-party server using the logged-in account included in the verified login authorization information.

The present disclosure also includes another exemplary method for controlling access to a third-party server by a mobile terminal. Embodiments of the method include: receiving, at the third-party server from the mobile terminal, a login request that includes login authorization information, wherein the login authorization information is acquired from a first-party server after the first-party server has been logged in by a user of the mobile terminal using the login authorization information through a client-side application corresponding to the first-party server, wherein the login authorization information includes a logged-in account; verifying the login authorization information included in the received login request; and authorizing the user to log in the third-party server using the logged-in account included in the login authorization information after the verification is passed.

The present disclosure further includes another exemplary method for controlling access to a third-party server by a mobile terminal. Embodiments of the method include: receiving, at a second-party server, login status information of a logged-in account included in login authorization information, wherein a first-party server has been logged in by a user of the mobile terminal using the login authorization information through a client-side application corresponding to the first-party server; verifying the login status information and/or the login authorization information; and after the verification is passed, transmitting to the mobile terminal an authorization page prompting the user to confirm authorizing the third-party server to use the logged-in account for the user to log in the third-party server.

The present disclosure also includes an exemplary mobile terminal for accessing a third-party server. Embodiments of the mobile terminal include: an authorization-information acquisition unit to acquire, from a first-party server, login authorization information using which a user of the mobile terminal has logged in the first-party server through a client-side application corresponding to the first-party server, wherein the login authorization information includes a logged-in account; a login-authorization unit to transmit, to the third-party server, a login request including the login authorization information, wherein the login authorization information is verified and the user is authorized to log in the third-party server using the logged-in account included in the verified login authorization information.

The present disclosure further includes an exemplary resource server providing resources to be accessed by a mobile terminal. Embodiments of the resource server include: a login-request receiving unit to receive a login request including login authorization information, wherein the login authorization information is acquired from a first-party server after the first-party server has been logged in by a user of the mobile terminal using the login authorization information through a client-side application corresponding to the first-party server, wherein the login authorization information includes a logged-in account; and a login authorization unit to verify the login authorization information included in the received login request, and authorize the user to log in the resource server using the logged-in account included in the login authorization information after the verification is passed.

The present disclosure further includes a controlling server for controlling access to a third-party server by a mobile terminal. Embodiments of the controlling server include: a first information-receiving unit to receive, from the mobile terminal, login status information of a logged-in account included in login authorization information, wherein a first-party server has been logged in by a user of the mobile terminal using the login authorization information through a client-side application corresponding to the first-party server, and a first information-transmission unit to verify the login status information and/or the login authorization information, and after the verification is passed, transmit to the mobile terminal an authorization page prompting the user to confirm authorizing the third-party server to use the logged-in account for the user to log in the third-party server.

An exemplary system for controlling access to a third-party server by a mobile terminal in accordance with the present disclosure comprises a mobile terminal, a first-party server, and a third-party server. The mobile terminal is configured to: acquire, from a first-party server, login authorization information using which a user of the mobile terminal has logged in the first-party server through a client-side application corresponding to the first-party server, wherein the login authorization information includes a logged-in account; transmit, to the third-party server, a login request, wherein the login request includes the login authorization information. The third-party server is configured to: verify the he login authorization information; and after the verification is passed, authorize the user to log in the third-party server using the logged-in account included in the verified login authorization information.

In some embodiments, the exemplary system further comprises a second-party server. The second-party server is configured to: receive login status information of a logged-in account included in login authorization information; verify the login status information and/or the login authorization information; and after the verification is passed, transmit to the mobile terminal an authorization page prompting the user to confirm authorizing the third-party server to use the logged-in account for the user to log in the third-party server.

It is to be understood that both the foregoing general description and the following detailed description are exemplary and explanatory only and are not restrictive of the invention, as claimed.

DETAILED DESCRIPTION

Reference will now be made in detail to the exemplary embodiments illustrated in the accompanying drawings. Wherever possible, the same reference numbers will be used throughout the drawings to refer to the same or like parts. In the description below, details such as system structures, interfaces, and technologies are provided as illustrations for thorough understanding of embodiments of the present disclosure, but not to limit the scope of the disclosure those specific embodiments. Also, a person with an ordinary skill in the art will understand that embodiments of the present disclosure can be implemented even without details that are omitted in the description below. Furthermore, detailed descriptions about well-known systems, devices, circuits, and methods are omitted so as not to hinder describing various embodiments of the present disclosure.

Figure 1:
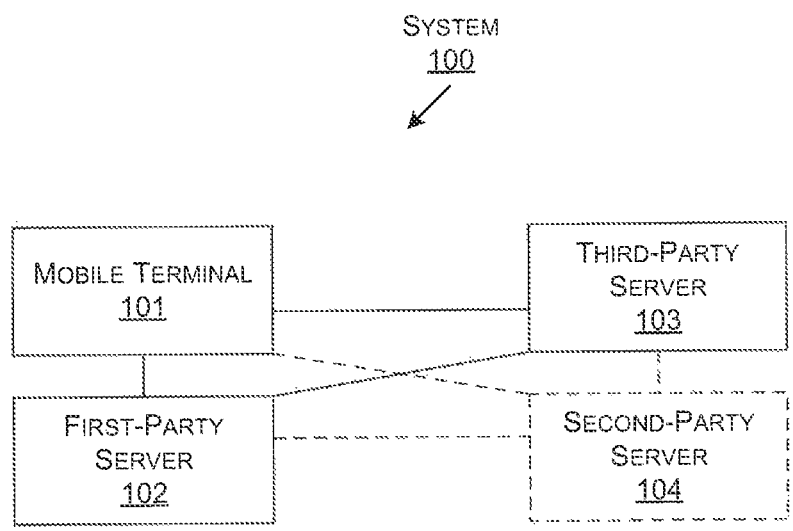
FIG. 1 is a network architecture diagram illustrating an exemplary system for controlling mobile terminal access to third-party resources according to embodiments of the present disclosure.

FIG. 1 is a network architecture diagram illustrating an exemplary system 100 for controlling mobile terminal access to third-party resources, according to embodiments of the present disclosure. For convenience, only components needed to describe embodiments of the present disclosure are shown. System 100 includes a mobile terminal 101, a first-party server 102, and a third-party server 103. In some embodiments, system 100 may also include a second-party server 104.

Mobile terminal 101, first-party server 102, third-party server 103, and second-party server 104 connect and communicate with each other, over a data network. A data network disclosed in this disclosure may include Local Area Networks (LANs) and/or Wide Area Networks (WANs), and may be wireless, wired, or a combination thereof. Mobile terminal 101 may be any terminal device, for example, a personal digital assistant (PDA), a cell phone or smartphone, a laptop, a tablet PC, or any electronic device capable of accessing data via a data network.

First-party server 102, third-party server 103, and second-party server 104 each may be a standalone server, or a server comprising several functional servers. A server disclosed herein can be a web server, an enterprise server, or any other type of computer servers. It can be a PDA, a cell phone or smartphone, a laptop, a desktop, a tablet computer, or any device that can provide data resources. The server may include software applications for providing data resources over a data network.

In some embodiments, a user of mobile terminal 101, through a client-side application associated with an account system, logs onto a first-party server 102 that corresponds to the client terminal. Afterwards, according to the user's operation command, mobile terminal 101 acquires, from first-party server 102, authorization information using which the user has logged in first-party server 102 and can be used for authorizing the user to log in third-party server 103. Mobile terminal 101 then transmits to third-party server 103 a login request message that carries the authorization information. After receiving the login request message, third-party server 103 verifies the authorization information included in the login request message. After having passed the verification, third-party server 103 authorizes the user of mobile terminal 101 to login using a login name of an account system. The login name is included in or corresponds to the authorization information.

In some embodiments, the authorization information can include, but is not limited to, an application identifier (e.g. "AppID"), a scope of authorization (e.g. what operations the user can do after logging in to the third-party server), uniform resource locator for redirecting a webpage (i.e., "redirect_URL"), and other information.

In some exemplary embodiments, the client-side application associated with the account system may be Tencent QQ™ client (referred as "QQ client" hereafter), Weibo (which is one type of Twitter) client, a web browser, etc. The first-party server can be a server-side application corresponding to the client-side application, and it can be, for example, a QQ server, a Weibo server, etc. The third-party server can be a corresponding third-party website, such as a shopping site, an email website, a web forum site, etc.

Furthermore, in some embodiments, acquiring from first-party server 102 the authorization information for logging in to third-party server 103 may include the following steps:

Mobile terminal 101 receives, via a web browser, the login request message submitted by the user to third-party server 103. After receiving the login request message, third-party server 103 transmits to mobile terminal 101 login page information, which includes at least one account system login link. A user can then click on the at least one account system login link to log into the account system.

Mobile terminal 101 receives and displays, via its browser, the login page information. And mobile terminal 101 then detects or determines that the user has clicked on any one of the at least one account system login link on the login page, and that the mobile terminal browser supports cross-site login (e.g. the browser has installed components for cross-site login, which is a cross-domain or cross-site single sign-on mechanism through which a user can use one set of login credentials, such as a QQ account number/password, to gain access to multiple secured websites or systems). Afterwards, mobile terminal 101 acquires, from first-party server 102 that is associated with the clicked login link, the authorization information for logging onto third-party server 103.

Furthermore, in some embodiments, exemplary system 100 may also include a second-party server 104. Second-party server 104 connects and communicates with mobile terminal 101, first-party server 102, and third-party server 103 via a data network. Second-party server 104 can be used to manage first-party server 102, or a third-party server authorized by first-party server 102. Exemplary embodiments are described as follows:

Mobile terminal 101 acquires from first-party server 102 its login status information of an account that has logged into an account system (referred as "logged-in account" hereafter), and transmits to second-party server 104 the login status information and/or the authorization information. Second-party server 104 verifies the login status information and/or the authorization information (in some embodiments, second-party server 104 may pre-store the login status information and/or the authorization information of the first-party server 102). After having passed the verification, second-party server 104 transmits to the mobile terminal 101 authorization page information, prompting the user to confirm authorizing third-party server 103 to use the logged-in account information to log in the third-party server.

Mobile terminal 101 receives and displays the authorization page information. After receiving the user's confirmed authorization, mobile terminal 101 transmits the confirmation to second-party server 104.

After receiving the confirmed authorization, second-party server 104 transmits an user identifier ("OpenID") and an authorization token ("Token") to third-party server 103. After receiving the user identifier and the authorization token, third-party server 103 transmits to second-party server 104 a request message for acquiring the logged-in account information. The request message carries the user identifier and the authorization token.

After receiving the request message, second-party server 104 verifies the user identifier and the authorization token. After having passed the verification, second-party server 104 then transmits the logged-in account information to third-party server 103.

In some embodiments, the login status information can be encrypted and transmitted in a predetermined format. In some embodiments, the login status information comprises a timestamp, indicating that the login status information is valid within a certain time frame (e.g. within 1 minute after the timestamp). In some embodiments, in order to enhance security, the login status information can be associated with an application identifier (e.g., AppID) included in the authorization information. The login status information is valid for a specific application identifier.

Furthermore, in some embodiments, after receiving the logged-in account information transmitted from the second-party server, the third-party server authorizes a mobile terminal user to log in using the logged-in account.

Figure 2:
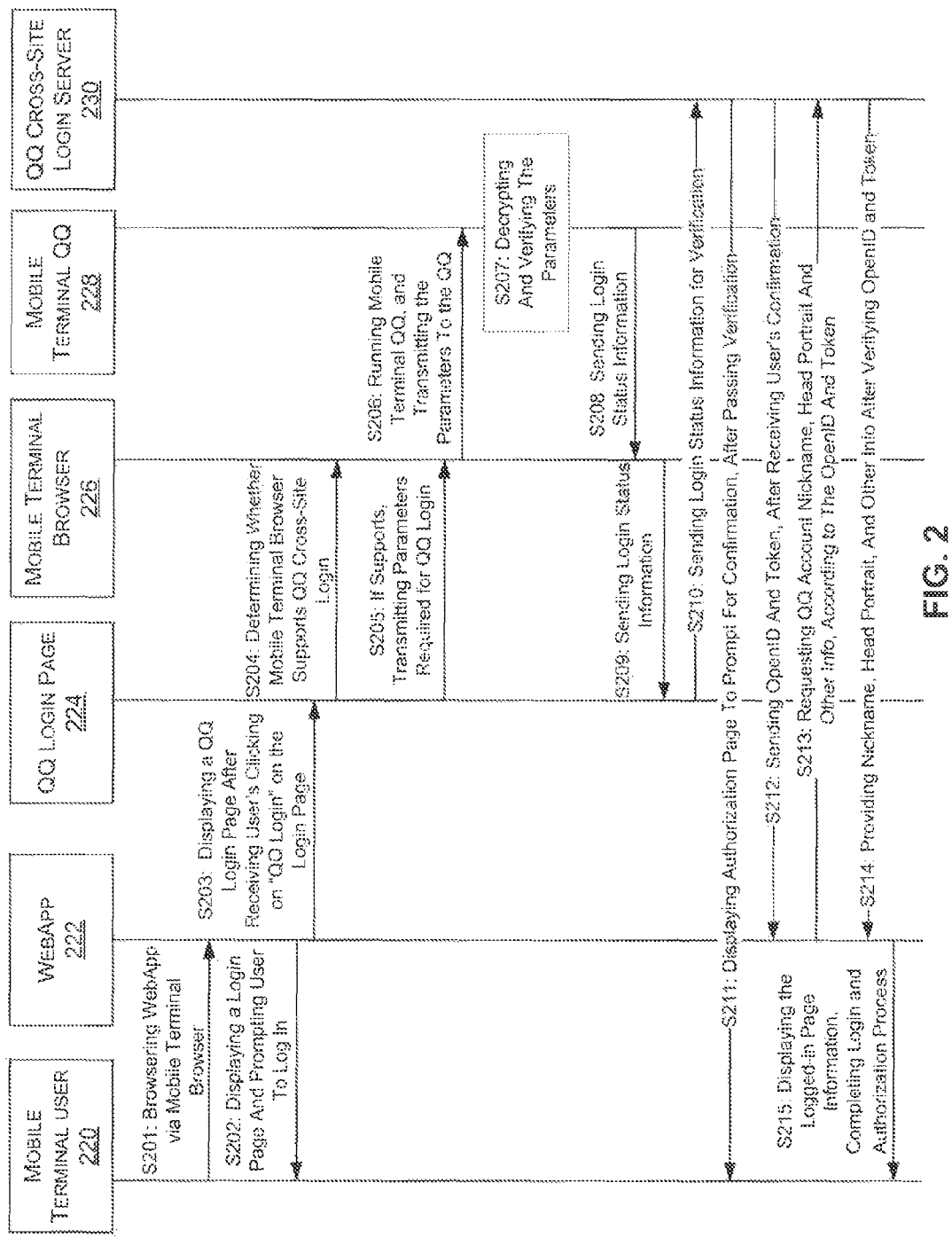
FIG. 2 illustrates an exemplary application for controlling mobile terminal access to third-party resources according to embodiments of the present disclosure.

FIG. 2 illustrates an exemplary application for controlling mobile terminal access to third-party resources according to embodiments of the present disclosure. The exemplary application involves several components or players, for example, a mobile terminal user 220, a web application WebApp 222, a cross-site login page such as a QQ login page 224, a mobile terminal browser 226, a client-side application such as a mobile terminal QQ 228, and a cross-site login server such as a QQ cross-site login server 230. In some embodiments, WebApp 222, QQ login page 224, mobile terminal browser 226, and mobile terminal QQ may be running on a mobile terminal 101 of FIG. 1. The above components interact with each other to control mobile terminal access to third-party resources, as described below.

At step S201, mobile terminal user 220 browses or opens WebApp 222 via, for example, a mobile terminal browser 226. The browser is installed with a QQ cross-site-login component. At step S202, WebApp displays a login page and prompts the user to login. In some embodiments, the login page includes a QQ login link to support the user to conduct cross-site login with the user's QQ account. At step S203, upon detecting that the user has clicked on the QQ login link, a QQ login page 224 is displayed. At step S204, the QQ login page inquires whether mobile terminal browser 226 supports QQ cross-site login.

At step S205, if the mobile terminal browser supports QQ cross-site login, QQ login page 224 transmits to mobile terminal browser 226 parameters needed to log in to the user's QQ account. The parameters includes an application identifier AppID (which is an identifier assigned by a QQ cross-site-login component when a third-party application uses a QQ account for cross-site login), a scope of required authorization, redirect_URL for website redirection, and other parameters. In some embodiments, to enhance security, the parameters can be encrypted. If the mobile terminal browser does not support QQ cross-site login, it may prompt the user to enter a login name and a password.

At step S206, after acquiring the parameters for QQ login, mobile terminal browser 226 can open, run, or activate a client-side application such as a mobile terminal QQ 228 through the QQ cross-site-login component. The browser then transmits the parameters to the mobile terminal QQ. In some embodiments, if the mobile terminal QQ is not installed on the mobile terminal, the mobile terminal QQ would fail to run, and the mobile terminal browser may display error information on the QQ login page, which prompts the user to enter a login name and a password to login.

At step S207, after being activated, mobile terminal QQ 228 prompts the user to login if the user has not logged in. If the user has logged into mobile terminal QQ 228, the mobile terminal QQ decrypts and verifies the parameters transmitted by mobile terminal browser 226.

At step 208, after having passed the verification of the parameters, mobile terminal QQ 228 returns login status information to mobile terminal browser 226. In some embodiments, the login status information is encrypted and transmitted in a predetermined format. The login status information may comprise a timestamp, indicating that the login status information is valid within a certain time frame (e.g. within 1 minute after the timestamp). In some embodiments, in order to enhance security, the login status information can be associated with an application identifier in authorization information. That means that the login status information is valid for a specific AppID. Moreover, although not shown in FIG. 2, mobile terminal QQ 228 can also synchronize the login status information with that stored on a QQ cross-site login server 230. The synchronized login status information can be used by the cross-site login server for subsequent verification of the login status information.

At step S209, after acquiring the login status information from mobile terminal QQ 228, mobile terminal browser 226 sends or transmits the login status information to QQ login page 224. At step S210, QQ login page 224 sends or transmits the login status information and the parameters for QQ login to QQ cross-site login server 230 for verification. At step S211, after having passed the verification, QQ cross-site login server 230 displays an authorization page to mobile terminal user 220, prompting the user to confirm authorizing WebApp 222 to use the QQ account information (including a nickname, a head portrait, etc.) for cross-site login.

At step S212, after receiving the user's confirmation authorizing the use of the QQ account information for cross-site login, QQ cross-site login server 230 sends to WebApp 222 a user identifier ("OpenID") and a authorization token ("Token"). An OpenID servers as the user's unique identifier after the user has logged in a WebApp. Each OpenID is uniquely associated with a QQ number (which is a QQ account number), while each QQ number can be associated with different OpenIDs in different WebApps. Also, a Token can be provided by a QQ server after the mobile terminal user authorizes using his/her QQ number to log in a WebApp. The Token is a character string that the QQ server provides to the WebApp to indicate that the user's authorization is valid.

At step S213, according to the OpenID and Token, WebApp 222 sends to QQ cross-site login server 230 a request for the user's QQ account information such as a nickname, a head portrait, etc. The request includes the OpenID and Token. At step S214, after confirming that the received OpenID and Token are valid, QQ cross-site login server 230 returns the requested nickname, head portrait, and other information to the WebApp.

At Step S215, after acquiring the nickname, head portrait, and other information, WebApp 222 authorizes the user to log in the WebApp using the acquired information, displays to the user the logged-in page information, and completes the login and authorization process.

In this exemplary application, QQ cross-site login server 230 can represent a first-party server 102 of this disclosure while QQ login page 224 is a client-side application associated with the first-party server. A QQ server (not shown in FIG. 2) for mobile terminal QQ 228 or mobile terminal QQ 228 can represent a second-party server 104 of this disclosure. And a server proving services for WebApp 222 can represent a third-party server 103 of this disclosure.

This exemplary application demonstrates that a mobile terminal user can access, via an existing QQ account, all mutually-trusted third-party applications, without registering additional login accounts. This simplifies the user's login process and improves user's access efficiency.

It is appreciated by an ordinary skill in the art that this exemplary application is provided for an explanatory purpose, but not for limiting the scope of this disclosure.

Figure 3:
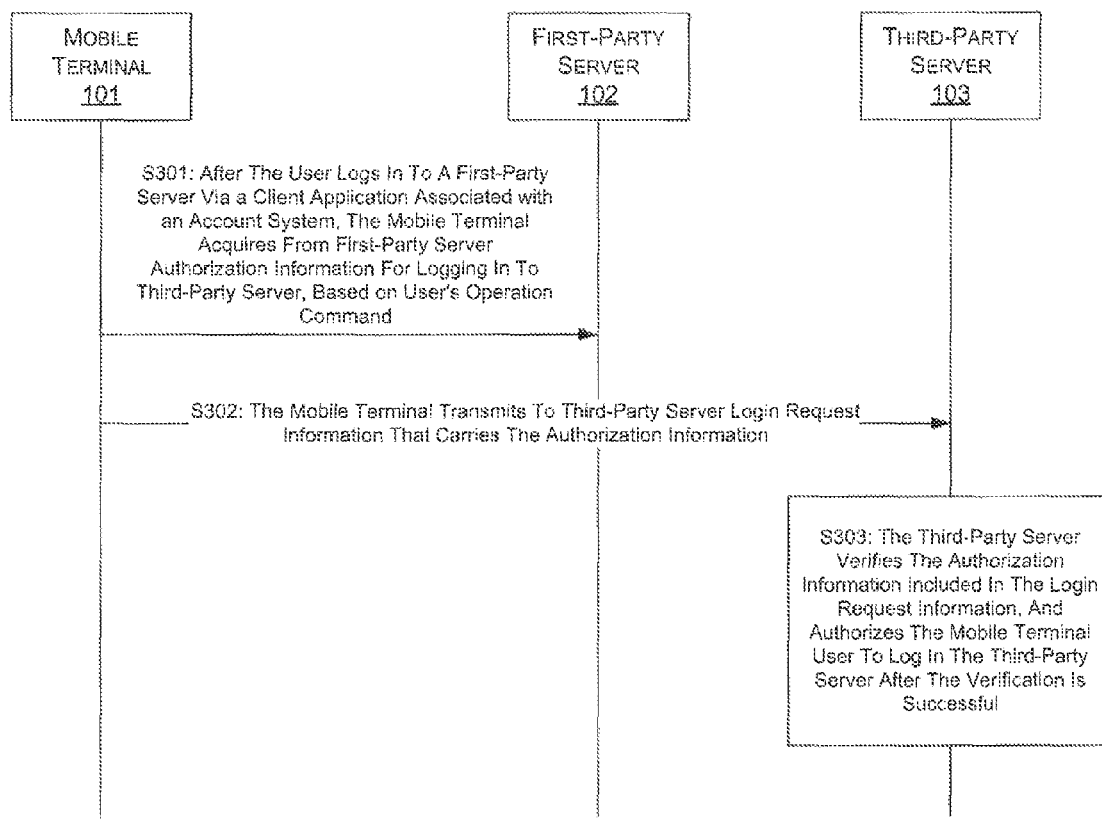
FIG. 3 is an interactive flow diagram illustrates an exemplary method, at the system of FIG. 1, for controlling mobile terminal access to third-party resources according to embodiments of the present disclosure.

Based on the system architecture as shown in FIG. 1, embodiments of the present disclosure provide an exemplary interactive method for controlling mobile terminal access to third-party resources. As shown in FIG. 3, embodiments of the interactive method are described as follows.

At step S301, through a client-side application associated with an account system, a user of mobile terminal 101 logs in a first-party server 102 that corresponds to the client-side application. Afterwards, based on the user's operation command, the mobile terminal acquires from the first-party server authorization information to be used for logging onto a third-party server 103. The authorization information includes a logged-in account.

In some embodiments, step S301 further includes the following steps: Mobile terminal 101 receives, via its browser, login request information sent by the user to third-party server 103. After receiving the login request information, the third-party server sends login page information to the mobile terminal. In some embodiments, the login page information includes at least one account system login link.

The mobile terminal receives and displays, via its browser, the login page information. And the mobile terminal then detects and determines that the user has clicked on any of the at least one login link included in the login page information, and that the mobile terminal browser supports cross-site login. Based on a detection result, the mobile terminal acquires, from a first-party server corresponding to the clicked login link, authorization information using which the user can log onto the third party server.

In some embodiments, the authorization information includes, but is not limited to, an application identifier AppID, a scope of authorization (e.g. what the user can do after logging onto the third-party server), redirect_URL for webpage redirection, and other information. In some embodiments, the client-side application associated with an account system can be, for example, a QQ client, a Weibo client, etc. The first-party server can be a server-side application corresponding to the client-side application, and it can be, for example, a QQ server, a Weibo server, etc. The third-party server can be a corresponding third-party site, such as a shopping site, an E-mail website, a web forum site, etc.

Referring back to FIG. 3, at step S302, mobile terminal 101 transmits to third-party server 103 login request information that carries the authorization information. In some embodiments, the authorization information may be encrypted. The mobile terminal includes the encrypted authorization information into the login request information, and transmits it to third-party server 103.

At step S303, after receiving the login request information, third-party server 103 verifies the authorization information included in the login request information, and authorizes the mobile terminal user to log in using the logged-in account included in the authorization information after the verification is successful. In some embodiments, if the authorization information is encrypted, the verification can occur after the decryption. In some embodiments, the verification can be focused on an AppID, a scope of authorization, etc.

Furthermore, in some embodiments, the exemplary method may also include the following steps:

The mobile terminal acquires, from the first-party server, the login status information of the logged-in account, and sends the login status information and/or authorization information to the second-party server. The second-party server verifies the login status information and/or the authorization information. After passing the verification, the second-party server sends authorization page information to the mobile terminal, prompting the user to confirm authorizing the third-party server to use the logged-in account information for cross-site login.

The mobile terminal receives and displays the authorization page information and, after receiving the confirmation from the user, sends the confirmation to the second-party server. After receiving the confirmation, the second-party server sends the user's OpenID and Token to the third-party server. After receiving the OpenID and Token, the third-party server sends to the second-party server a request information for acquiring logged-in account information. The request information includes the OpenID and the Token. After receiving the request, the second-party server verifies the OpenID and Token in the request and, after verification, sends the logged-in account information to the third-party server.

In some embodiments, the login status information is encrypted and sent in a predetermined format. In exemplary embodiments, the login status information also includes a timestamp, indicating that the login status information is valid within a certain time frame (e.g. within 1 minute after the timestamp). In some embodiments, in order to enhance security, the login status information can be associated with an AppID included in the authorization information. In some embodiments, the login status information is valid for a specific AppID.

In some embodiments, after receiving the logged-in account information sent by the second-party server, the third-party server authorizes the mobile terminal user to log in using the login name of the logged-in account information.

In exemplary embodiments of the present disclosure, the mobile terminal user can access all mutually-trusted third-party servers, using a login name of an existing account system. In this way, there is no need for the mobile terminal user to register different accounts for different websites, nor to memorize the account information for different websites, nor to repeatedly enter different account information for validation and login to different websites. As a result, it simplifies the user's operation process, and improves access efficiencies. Furthermore, the risk of leaking account information due to repeated entering account numbers and passwords can be avoided, and the access security can be enhanced.

Figure 4:
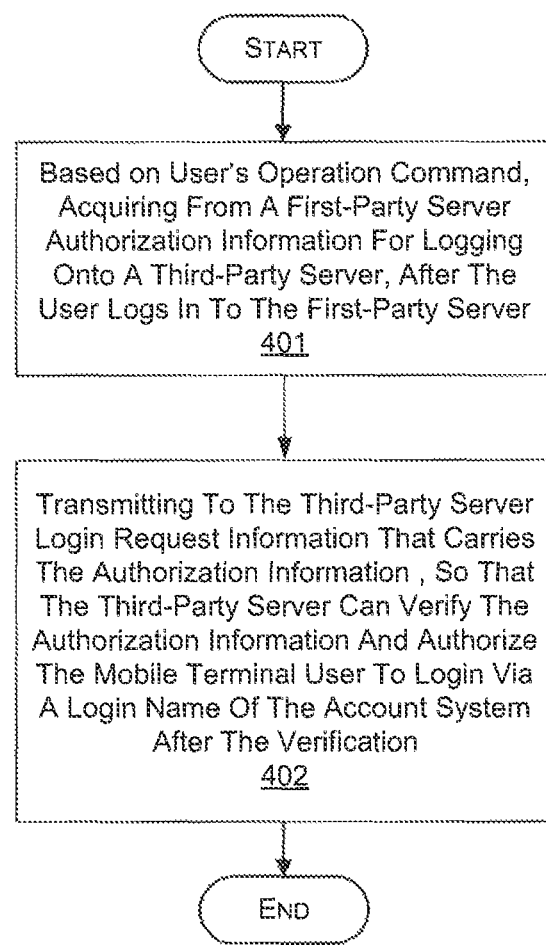
FIG. 4 is a flow diagram illustrating an exemplary method, at a mobile terminal, for controlling mobile terminal access to third-party resources according to embodiments of the present disclosure.

Based on the system architecture diagram shown in FIG. 1, embodiments of the present disclosure also provides a method for controlling mobile terminal access to the third-party server, as shown in FIG. 4. The exemplary method can be implemented by mobile terminal 101 as shown in FIG. 1. The exemplary method is described as follows.

At step S401, a user logs in a first-party server that corresponds to the client-side application, through a client-side application associated with an account system. Afterwards, based on the user's operation command, mobile terminal 101 acquires from the first-party server authorization information to be used for logging into the third-party server. The authorization information includes a logged-in account.

At step S402, the mobile terminal transmits to the third-party server login request information that carries the authorization information. After receiving the login request information, the third-party server can verify the authorization information included in the login request information, and after the verification, authorize the mobile terminal user to log in the server using the logged-in account included in the authorization information.

In some embodiments, the mobile terminal's acquisition of the authorization information based on the user's operation command further includes the following steps:

The mobile terminal receives, via its browser, the login request information sent by the user to the third-party server, so that the third-party server can send login page information to the mobile terminal after receiving the login request information. The login page information can include at least one account system login link.

The mobile terminal receives and displays, via its browser, the login page information. After detecting that the user clicks on the at least one account system login link, and that the mobile terminal browser supports cross-site login, the mobile terminal acquires, from the first-party server that corresponds to the clicked link, authorization information to be used for logging in to the third-party server.

Furthermore, the exemplary embodiments also include the following steps: The mobile terminal acquires, from the first-party server, login status information for the logged-in account, and sends the login status information and/or authorization information to the second-party server. The second-party server verifies the login status information and/or authorization information. After the verification, the second-party server transmits authorization page information to the mobile terminal prompting the user to confirm authorizing the third-party server to use the logged-in account information to log in. The mobile terminal receives and displays the authorization page information and, after receiving the user's confirmation for the authorization, sends the confirmation to the second-party server. After receiving the confirmation, the second-party server sends a user identifier ("OpenID") and an authorization token ("Token") to the third-party server.

In the exemplary embodiments, the login status information comprises a timestamp. And the login status information is associated with an application identifier AppID.

The implementation of the exemplary embodiments has been described for corresponding embodiments in FIG. 3, and therefore is omitted here.

Figure 5:
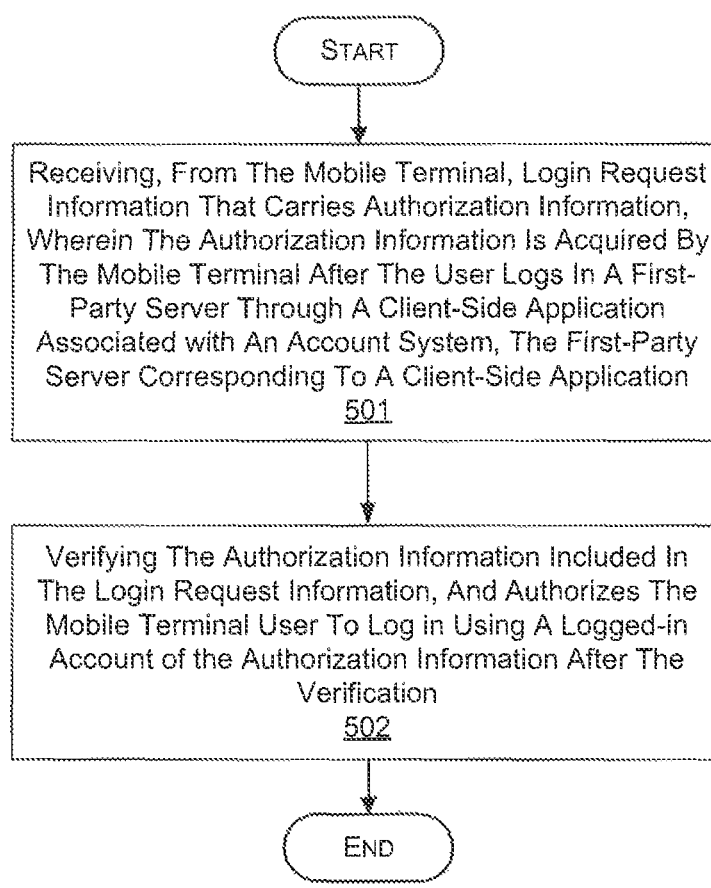
FIG. 5 is a flow diagram illustrating an exemplary method, at a third-party server, for controlling mobile terminal access to third-party resources according to embodiments of the present disclosure.

Based on the system architecture diagram as shown in FIG. 1, the embodiments of this disclosure provide an exemplary method of downloading information by a mobile terminal, as shown in FIG. 5. The exemplary method can be implemented by a third-party server 103 as shown in FIG. 1. The exemplary method is described as follows:

At step S501, third-party server 103 receives, from a mobile terminal, login request information that carries the authorization information. The authorization information is acquired by the mobile terminal after the user, through a client-side application associated with an account system, logs onto a first-party server that corresponds to the client-side application. The authorization information is acquired from the first-party server based on the user's operation command and is the information about the user's logging in the third-party server. The authorization information includes a logged-in account.

At step S502, the third-party server verifies the authorization information included in the login request information. After passing the verification, the third-party server authorizes the mobile terminal to log in using the logged-in account included in the authorization information.

Furthermore, in these embodiments, acquiring from the first-party server the authorization information to be used for logging in the third-party server includes the following steps. The third-party server receives the login request information sent by the mobile terminal via its browser. After receiving the login request information, the third-party server sends login page information to the mobile terminal. The login page information comprises at least one account system login link. The mobile terminal receives and displays, via its browser, login page information. After detecting that the user has clicked on one of the at least one login link, and that mobile terminal browser supports cross-site login, the mobile terminal receives, from the first-party server that corresponds to the clicked login link, the authorization information to be used for logging in to the third-party server.

Furthermore, these embodiments also comprise the following steps. The third-party server receives a user identifier ("OpenID") and an authorization token ("Token") sent from the second-party server, and sends to the second-party server the request information for acquiring logged-in account information. The request information includes the OpenID and the Token. After receiving the request information, the second-party server verifies the OpenID and the Token included in the request information and after passing the verification, sends to the third-party server the logged-in account information for logging in the third-party server.

In exemplary embodiments, authorizing the mobile terminal to login using the logged-in account information includes, specifically, authorizing the mobile terminal to login using the logged-in account information, after receiving the logged-in account information from the second-party server.

The implementation of these embodiments has been described for corresponding embodiments in FIG. 3, and therefore is omitted herein.

Figure 6:
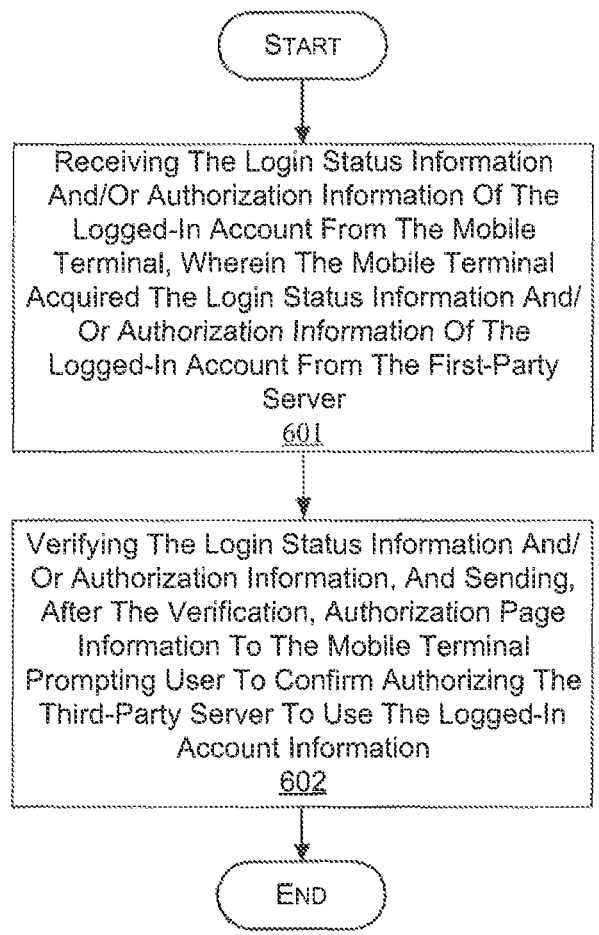
FIG. 6 is a flow diagram illustrating an exemplary method, at a second-party server, for controlling mobile terminal access to the third-party resources according to embodiments of the present disclosure.

Based on the system architecture diagram as shown in FIG. 1, the embodiments of the present disclosure provide another exemplary method, as shown in FIG. 6, for controlling mobile terminal access to third-party resources. The exemplary method can be implemented by a second-party server 104 as shown in FIG. 1. The exemplary method is described as follows.

At step S601, the second-party server receives login status information and/or authorization information of a logged-in account from the mobile terminal. The login status information and/or authorization information of the logged-in account is acquired by the mobile terminal from a first-party server.

At step S602, the second-party server verifies the login status information and/or authorization information, and sends, after the verification, authorization page information to the mobile terminal prompting the user to confirm authorizing the third-party server to use the logged-in account information for cross-site login.

Furthermore, the embodiments comprise also includes the following steps:

The second-party server receives the user's confirmation for the authorization sent from the mobile terminal, wherein the mobile terminal receives the confirmation from the user after displaying the authorization page information to the user.

The second-party server sends a user identifier ("OpenID") and an authorization token ("Token") to the third-party server. After receiving the OpenID and the Token, the third-party server returns request information for logged-in account information. The request information includes the OpenID and the Token.

After receiving the request information, the second-party server verifies the OpenID and the Token included in the request information. After passing the verification, the second-party server sends the logged-in account information to the third-party server, so that the third-party server can authorize the mobile terminal user to login using a login name of the logged-in account information.

In these embodiments, login status information may comprise a timestamp. And the login status information is associated with an application identifier AppID.

The implementation of these embodiments has been described for corresponding embodiments in FIG. 3, and therefore is omitted here.

It is understood that the above-described exemplary process flows in FIGS. 2-6 are for illustrative purposes only. Certain steps may be deleted, combined, or rearranged, and additional steps may be added.

Figure 7:
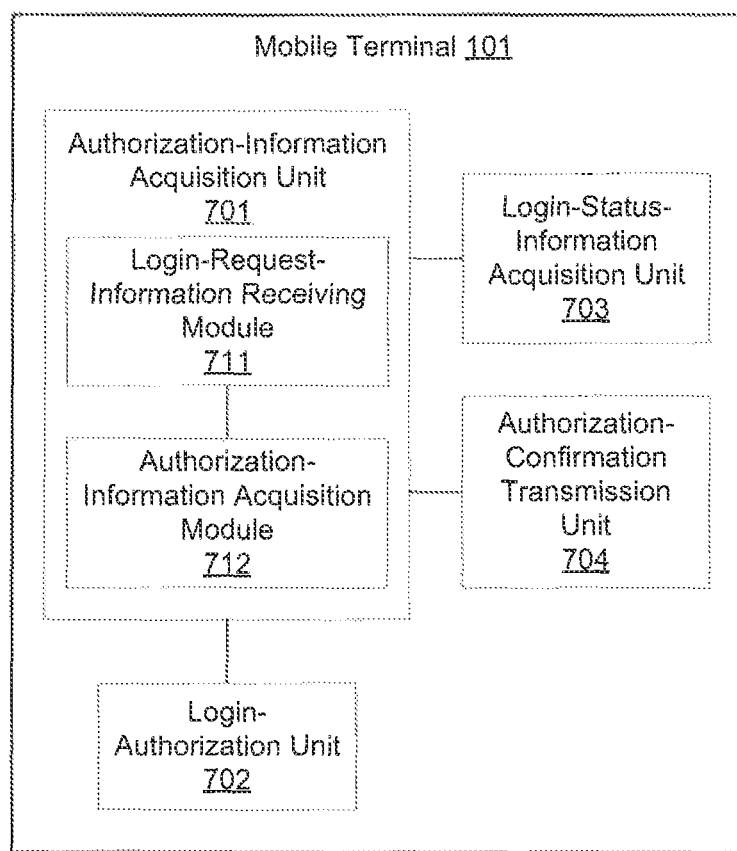
FIG. 7 is a schematic diagram illustrating an exemplary terminal device according to embodiments of the present disclosure.

FIG. 7 is a schematic diagram illustrating an exemplary mobile terminal 101 of FIG. 1 according to embodiments of the present disclosure. For convenience, only the components relevant to this disclosure are shown. The mobile terminal shown FIG. 7 can also be used in the system as shown in FIG. 1.

Mobile terminal 101 comprises an authorization-information acquisition unit 701 and a login-authorization unit 702. In some embodiments, mobile terminal 101 also includes a login-status-information acquisition unit 703 and an authorization-confirmation transmission unit 704. The exemplary functions of each unit are described as follows.

Authorization-information acquisition unit 701 is configured to acquire from the first-party server authorization information to be used for logging into a third-party server, after the user logs in a first-party server that corresponds to the client-side application through a client-side application associated with an account system. In some embodiments, authorization-information acquisition unit 701 further comprises a login-request-information receiving module 711 and an authorization-information acquisition module 712. Login-request-information receiving module 711 is configured to receive, via a mobile terminal browser, login request information sent by the user to the third-party server. After receiving the login request information, the third-party server can send login page information to the mobile terminal. The login page information includes at least one account system login link. Authorization-information acquisition module 712 is configured to receive and display login page information via a mobile terminal browser, and to acquire authorization information to be used for logging in the third-party server, after detecting that the user has clicked on any of the account system login links and that the mobile terminal browser supports cross-site login.

Login-authorization unit 702 is configured to send to the third-party server login request information that includes the authorization information. After receiving the login request message, the third-party server can verify the authorization information included in the login request information, and after the verification, authorize the mobile terminal user to log in using the logged-in account of the account system.

In some embodiments, the mobile terminal further comprises a login-status-information acquisition unit 703 and an authorization-confirmation transmission unit 704. Login-status-information acquisition unit 703 is configured to acquire, from the first-party server, login status information for a logged-in account of the account system, and sends the login status information and/or authorization information to a second-party server. The second-party server verifies the login status information and/or authorization information, and sends, after the verification, authorization page information to the mobile terminal prompting the user to confirm authorizing the third-party server to use the logged-in account information for cross-site login.

Authorization-confirmation transmission unit 704 is configured to receive and display authorization page information, and after receiving the user's authorization confirmation, send the user's authorization confirmation to the second-party server. After receiving the confirmation, the second-party server sends a user identifier ("OpenID") and an authorization token ("Token") to the third-party server.

In these embodiments, the login status information further comprises a timestamp. And the login status information is associated with an application identifier AppID.

A person with ordinary skill in the art will understand that the partitioning of the mobile terminal as illustrated above is just for an illustration purpose, and that the mobile terminal can be partitioned in other manners to perform part of or all of the functions as described above. Each functional unit or module in the exemplary embodiments can be integrated into one processing unit or module, or each module can exist in a standalone form, or a plurality of the units or modules can be integrated into one unit or module. The aforementioned units or modules can either be realized in a hardware form, or in a form of software functional modules. In addition, the specific names for each functional unit and module are only used to distinguish from each other, not to limit the scope of the disclosures. Exemplary methods to implement the functionalities of these functional units or modules have been described in, for example, FIGS. 2-6, and the description is not repeated here.

Figure 8:
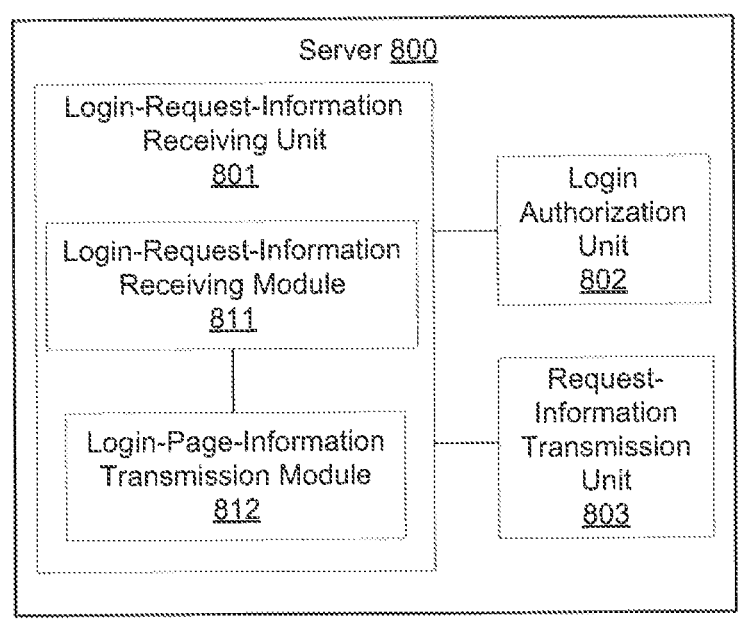
FIG. 8 is a schematic diagram illustrating an exemplary server according to embodiments of the present disclosure.

FIG. 8 is a schematic diagram illustrating an exemplary server 800 according to embodiments of the present disclosure. For convenience, only the components relevant to the present invention are shown. Exemplary server 800 can be applied in the system as shown in FIG. 1. In some embodiments, and exemplary server 800 can be a third-party server 103 of FIG. 1. In other embodiments, exemplary server 800 can be a first-party server 102 of FIG. 1.

Exemplary server 800 includes a login-request-information receiving unit 801 and a login-authorization unit 802. In some embodiments, exemplary server 800 may further include a request-information transmission unit 803.

Login-request-information receiving unit 801 is configured to receive login request information (which includes authorization information) sent by a mobile terminal. The authorization information is acquired by the mobile terminal after the user, through a client-side application associated with an account system, logs onto a first-party server that corresponds to the client-side application. The authorization information is acquired from the first-party server based on the user's operation command and is the information for the user to log in the third-party server.

In some embodiments, login-request-information receiving unit 801 further comprises a login-request-information receiving module 811 and a login-page-information transmission module 812. Login-request-information receiving module 811 is configured to receive the login request information sent by the mobile terminal via its browser. Login-page-information transmission module 812 is configured to transmit login page information to the mobile terminal, after receiving the login request information. The login page information comprises at least one account system login link. The mobile terminal can receive and display, via its browser, the login page information. Upon detecting that the user has clicked on any of the login link and that the browser supports cross-site login, the mobile terminal acquires, from a first-party server that corresponds to the clicked login link, authorization information for the user to log in the third-party server.

Login-authorization unit 802 is configured to verify the authorization information included in the login request information, and after passing the verification, authorize the mobile terminal user to log in using a login name of the logged-in account of the account system.

In some embodiments, exemplary server 800 may further comprise a request-information transmission module 803. Request-information transmission module 803 is configured to receive a user identifier ("OpenID") and an authorization token ("Token") from a second-party server, and to send to the second-party server request information for acquiring logged-in account information. The request information includes the OpenID and the Token. After receiving the request information and verifying the OpenID and Token included therein, the second-party server sends the logged-in account information to the third-party server.

Furthermore, login-authorization unit 802 is configured to authorize the mobile terminal user to log in the third-party server using the logged-in account, after receiving the logged-in account information sent from the second-party server.

Figure 9:
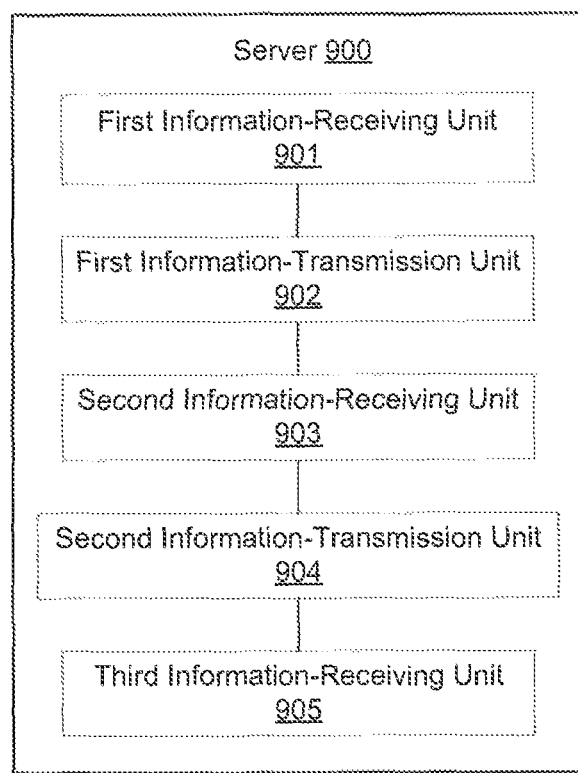
FIG. 9 is a schematic diagram illustrating another exemplary server according to embodiments of the present disclosure.

FIG. 9 is a schematic diagram illustrating another exemplary server 900 according to embodiments of the present disclosure. For convenience of explanation, only the components relevant to this disclosure are shown. The exemplary server can be applied in the system as shown in FIG. 1. In some embodiments, exemplary server 900 can be a second-party server 104 of FIG. 1.

Exemplary server 900 includes a first-information receiving unit 901 and a first information-transmission unit 902. In some embodiments, exemplary server 900 may further comprise a second information-receiving unit 903, a second information-transmission unit 904, and a third information-receiving unit 905. The functions of each unit are described as follows.

First information-receiving unit 901 is configured to receive login status information and/or authorization information of a logged-in account, sent from a mobile terminal. The login status information and/or authorization information is acquired by the mobile terminal from a first-party server.

First information-transmission unit 902 is configured to verify the login status information and/or authorization information, and after passing the verification, to send authorization page information to the mobile terminal prompting the user to confirm authorizing the third-party server to use the logged-in account information for cross-site login.

Second information-receiving unit 903 is configured to receive the authorization confirmation sent from the mobile terminal. The authorization confirmation is acquired by the mobile terminal after receiving and displaying authorization page information to the user and receiving the user's authorization confirmation.

Second information-transmission unit 904 is configured to transmit a user identifier ("OpenID") and an authorization token ("Token") to a third-party server. After receiving the OpenID and the Token, the third-party server returns request information for acquiring logged-in account information. The request information includes the OpenID and the Token.

Third information-receiving unit 905 is configured to receive the request information, verify the OpenID and Token included therein, and after passing the verification, transmit the logged-in account information to the third-party server. The third-party server can authorize the mobile terminal user to log in using the logged-in account, after receiving the logged-in account information.

In these embodiments, the login status information includes a timestamp. And the login status information is associated with an application identifier AppID.

A person with ordinary skill in the art will understand that the partitioning of the server as illustrated in FIGS. 8-9 is just for illustration purpose, and that the server can be partitioned in other manners to perform part of or all of the functions as described above. Each functional unit or module in the exemplary embodiments can be integrated into one processing unit or module, or each unit or module can exist in a standalone form, or a plurality of units or modules can be integrated into one unit or module. The aforementioned units or modules can either be realized in a hardware form, or in a form of software functional modules. In addition, the specific names for each functional unit and module are only used to distinguish from each other, not to limit the scope of the disclosure. Exemplary methods to implement the functionalities of these functional units or modules have been described in, for example, FIGS. 2-6, and their description is not repeated here.

In summary, in the embodiments of the present disclosure, a mobile terminal user can access all mutually-trusted third-party servers, using a login name of an existing account system. Therefore, the mobile terminal users may not need to register an account for each website, to memorize account information for different websites, and to repeatedly enter different account information to authenticate and log in those websites. As a result, the user can have better web-browsing experience, with enhanced efficiency. Furthermore, the risks of leaking login credentials due to repeated entry of accounts and passwords can be avoided, thereby enhancing the security of web access.

The methods and processes disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, a computer, or multiple computers. A computer program may be written in any form of programming language, including compiled or interpreted languages, and it may be deployed in any form, including as a standalone program or as a module, component, subroutine, or other module suitable for use in a computing environment. A computer program may be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing module (CPU) chip, a CPU chip combined on a motherboard, a general purpose computer, or any other combination of devices or modules capable of performing the methods disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

The invention claimed is:

1. A computer-implemented method for controlling access to a third-party server by a mobile terminal, the method comprising:
    receiving, at the mobile terminal, a cross-site login request from a first client-side application that corresponds to the third-party server for logging into a first account associated with the third-party server via a second account associated with a first-party server;
    transmitting a first set of parameters to a second client-side application that corresponds to the first-party server and that is currently running on the mobile terminal, wherein the first set of parameters includes an application identifier assigned to the first client-side application;
    receiving login status information from the second client-side application, wherein the login status information includes the application identifier assigned to the first client-side application and a login status indicator that indicates whether the second account that corresponds to the second-party server is currently logged in;
    transmitting, to the first-party server, a login authentication request, wherein the login authentication request includes the application identifier and the login status information; and
    receiving authorization from the first-parity server for the user to log into the first account associated with the third-party server, wherein one or more account information items from the second account associated with the first-party server are available to the user for using in the first account in the first client-side application.

2. The method according to claim 1, further comprising:
    receiving, at the mobile terminal via a browser, the cross-site login request;
    receiving, from the third-party server, a login page including at least one account-system login link for logging into the first account associated with the third-party server via the second account associated with a first-party server;
    displaying, via the browser, the login page;
    detecting that the user has clicked on the at least one account-system login link included in the login page and the browser supports cross-cite login; and
    based on the detection, performing the transmitting the first set of parameters to the second client-side application.

3. The method according to claim 1, further comprising:
    in accordance with a determination that the application identifier and the login status information are verified by the first-parity server,
    receiving an authorization page prompting the user to confirm authorizing the third-party server to use the one or more account information items from the second account associated with the first-party server for the user to log in the third-party server.

4. The method according to claim 3, further comprising:
displaying, at the mobile terminal, the authorization page;
receiving the user's confirmed authorization for the third-party server to use the one or more account information items from the second account associated with the first-party server to log in the third-party server; and
transmitting the user's confirmed authorization to the first-party server;
wherein:
a user identifier and an authorization token are transmitted to the third-party server;
an acquiring request for the one or more account information items from the second account is transmitted to the first-party server, the acquiring request including the user identifier and the authorization token; and
the one or more account information items from the second account are transmitted to the third-party server after the user identifier and the authorization token are verified.

5. The method according to claim 1, wherein:
the login status information comprises a timestamp, the login status information being valid within a predetermined time frame before the timestamp expires; and
the login status information is associated with the application identifier.

6. The method according to claim 1, wherein the first set of parameters comprise the application identifier, a scope of operations that require user authorization to perform by the mobile device, and a resource identifier for redirecting a webpage.

7. The method according to claim 1, wherein the first set of parameters are encrypted.

8. A mobile device, comprising:
one or more processors; and
memory storing one or more programs for execution by the one or more processors, the one or more programs including instructions for:
receiving, at the mobile device, a cross-site login request from a first client-side application that corresponds to the third-party server for logging into a first account associated with the third-party server via a second account associated with a first-party server;
transmitting a first set of parameters to a second client-side application that corresponds to the first-party server and that is currently running on the mobile device, wherein the first set of parameters includes an application identifier assigned to the first client-side application;
receiving login status information from the second client-side application, wherein the login status information includes the application identifier assigned to the first client-side application and a login status indicator that indicates whether the second account that corresponds to the second-party server is currently logged in;
transmitting, to the first-party server, a login authentication request, wherein the login authentication request includes the application identifier and the login status information; and
receiving authorization from the first-parity server for the user to log into the first account associated with the third-party server, wherein one or more account information items from the second account associated with the first-party server are available to the user for using in the first account in the first client-side application.

9. The mobile device of claim 8, wherein the one or more programs further include instructions for:
receiving, at the mobile device via a browser, the cross-site login request;
receiving, from the third-party server, a login page including at least one account-system login link for logging into the first account associated with the third-party server via the second account associated with a first-party server;
displaying, via the browser, the login page;
detecting that the user has clicked on the at least one account-system login link included in the login page and the browser supports cross-cite login; and
based on the detection, performing the transmitting the first set of parameters to the second client-side application.

10. The mobile device of claim 8, wherein the one or more programs further include instructions for:
in accordance with a determination that the application identifier and the login status information are verified by the first-parity server, receiving an authorization page prompting the user to confirm authorizing the third-party server to use the one or more account information items from the second account associated with the first-party server for the user to log in the third-party server.

11. The mobile device of claim 10, wherein the one or more programs further include instructions for:
displaying, at the mobile device, the authorization page;
receiving the user's confirmed authorization for the third-party server to use the one or more account information items from the second account associated with the first-party server to log in the third-party server; and
transmitting the user's confirmed authorization to the first-party server;
wherein:
a user identifier and an authorization token are transmitted to the third-party server;
an acquiring request for the one or more account information items from the second account is transmitted to the first-party server, the acquiring request including the user identifier and the authorization token; and
the one or more account information items from the second account are transmitted to the third-party server after the user identifier and the authorization token are verified.

12. The mobile device of claim 8, wherein:
the login status information comprises a timestamp, the login status information being valid within a predetermined time frame before the timestamp expires; and
the login status information is associated with the application identifier.

13. The mobile device of claim 8, wherein the first set of parameters comprise the application identifier, a scope of operations that require user authorization to perform by the mobile device, and a resource identifier for redirecting a webpage.

14. The mobile device of claim 8, wherein the first set of parameters are encrypted.

15. A non-transitory computer-readable storage medium having instructions stored thereon, the instructions, when executed by one or more processors of a mobile device, cause the processors to perform operations comprising:
- receiving, at a mobile device, a cross-site login request from a first client-side application that corresponds to the third-party server for logging into a first account associated with the third-party server via a second account associated with a first-party server;
- transmitting a first set of parameters to a second client-side application that corresponds to the first-party server and that is currently running on the mobile device, wherein the first set of parameters includes an application identifier assigned to the first client-side application;
- receiving login status information from the second client-side application, wherein the login status information includes the application identifier assigned to the first client-side application and a login status indicator that indicates whether the second account that corresponds to the second-party server is currently logged in;
- transmitting, to the first-party server, a login authentication request, wherein the login authentication request includes the application identifier and the login status information; and
- receiving authorization from the first-parity server for the user to log into the first account associated with the third-party server, wherein one or more account information items from the second account associated with the first-party server are available to the user for using in the first account in the first client-side application.

16. The non-transitory computer-readable storage medium of claim 15, wherein the instructions further cause the processors to perform operations comprising:
- receiving, at the mobile device via a browser, the cross-site login request;
- receiving, from the third-party server, a login page including at least one account-system login link for logging into the first account associated with the third-party server via the second account associated with a first-party server;
- displaying, via the browser, the login page;
- detecting that the user has clicked on the at least one account-system login link included in the login page and the browser supports cross-cite login; and
- based on the detection, performing the transmitting the first set of parameters to the second client-side application.

17. The non-transitory computer-readable storage medium of claim 15, wherein the instructions further cause the processors to perform operations comprising:
- in accordance with a determination that the application identifier and the login status information are verified by the first-parity server, receiving an authorization page prompting the user to confirm authorizing the third-party server to use the one or more account information items from the second account associated with the first-party server for the user to log in the third-party server.

18. The non-transitory computer-readable storage medium of claim 17, wherein the instructions further cause the processors to perform operations comprising:
- displaying the authorization page;
- receiving the user's confirmed authorization for the third-party server to use the one or more account information items from the second account associated with the first-party server to log in the third-party server; and
- transmitting the user's confirmed authorization to the first-party server;

wherein:
- a user identifier and an authorization token are transmitted to the third-party server;
- an acquiring request for the one or more account information items from the second account is transmitted to the first-party server, the acquiring request including the user identifier and the authorization token; and
- the one or more account information items from the second account are transmitted to the third-party server after the user identifier and the authorization token are verified.

19. The non-transitory computer-readable storage medium of claim 15, wherein:
- the login status information comprises a timestamp, the login status information being valid within a predetermined time frame before the timestamp expires; and
- the login status information is associated with the application identifier.

20. The non-transitory computer-readable storage medium of claim 15, wherein the first set of parameters comprise the application identifier, a scope of operations that require user authorization to perform by the mobile device, and a resource identifier for redirecting a webpage.

* * * * *